United States Patent
Fukutomi et al.

(10) Patent No.: US 7,570,562 B2
(45) Date of Patent: Aug. 4, 2009

(54) OPTICAL DISK UNIT

(75) Inventors: Yoshio Fukutomi, Chiba (JP); Toru Nagara, Tokyo (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 10/584,772

(22) PCT Filed: Dec. 22, 2004

(86) PCT No.: PCT/JP2004/019684

§ 371 (c)(1), (2), (4) Date: Jun. 28, 2006

(87) PCT Pub. No.: WO2005/066948

PCT Pub. Date: Jul. 21, 2005

(65) Prior Publication Data

US 2007/0127350 A1 Jun. 7, 2007

(30) Foreign Application Priority Data

Jan. 7, 2004 (JP) ............................. 2004-002271

(51) Int. Cl. *G11B 7/00* (2006.01)
(52) U.S. Cl. .............................. 369/53.26; 369/112.17; 369/116
(58) Field of Classification Search ................ 369/13.3, 369/112.02, 112.16, 112.17, 116
See application file for complete search history.

(56) References Cited

U.S. PATENT DOCUMENTS 5,363,363 A * 11/1994 Gage ........................... 369/116
5,555,538 A * 9/1996 Yanagawa et al. ....... 369/110.01
6,958,805 B2 * 10/2005 Kim ............................. 355/67

FOREIGN PATENT DOCUMENTS

| JP | 60-93649 | 5/1985 |
| JP | 63-100647 | 5/1988 |
| JP | 5-128535 | 5/1993 |
| JP | 6-267102 | 9/1994 |
| JP | 7-249233 | 9/1995 |
| WO | 95/00873 | 1/1995 |

* cited by examiner

Primary Examiner—Wayne R Young
Assistant Examiner—Brian Butcher
(74) Attorney, Agent, or Firm—Oblon, Spivak, McClelland, Maier & Neustadt, P.C.

(57) ABSTRACT

In an optical disk apparatus, transmittance and reflectance of a polarization beam splitter 13 to the S polarization and the P polarization of laser beams are adjusted so that a first polarization component level ratio in the laser beam received by a light receiver for reproducing signal 17 from a laser diode 11 via the polarization beam splitter 13, and a second polarization component level ratio in the laser beam received by a light receiver for monitoring light source 18 from the laser diode 11 via the polarization beam splitter 13 become equal or the difference between the first and the second polarization component level ratios becomes within a predetermined permissible range.

5 Claims, 3 Drawing Sheets

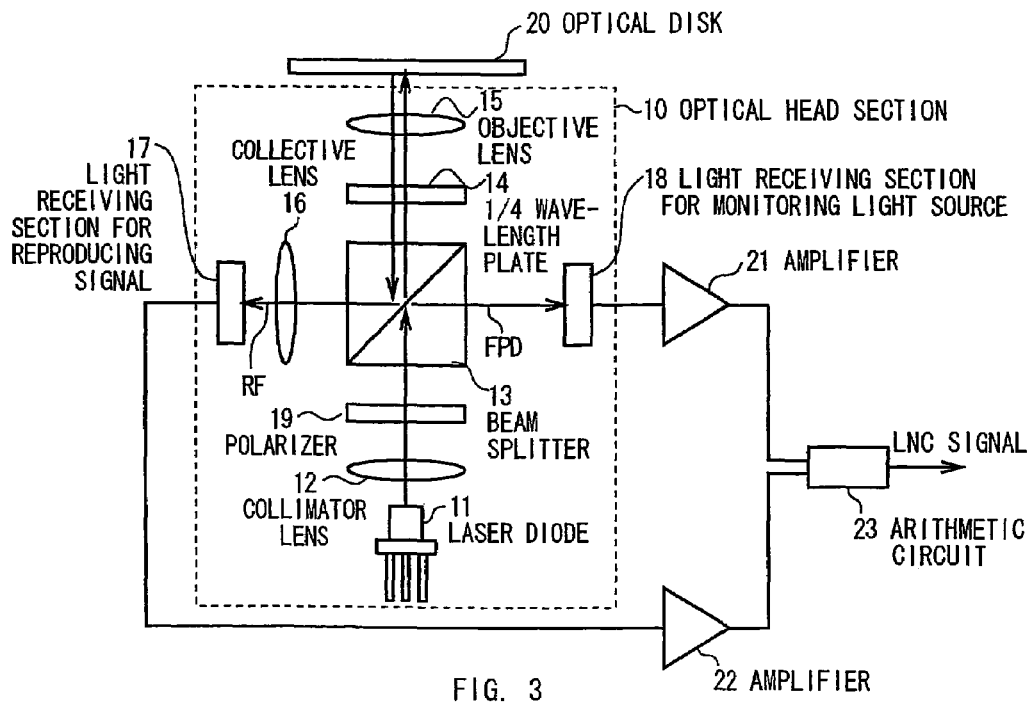
FIG. 3
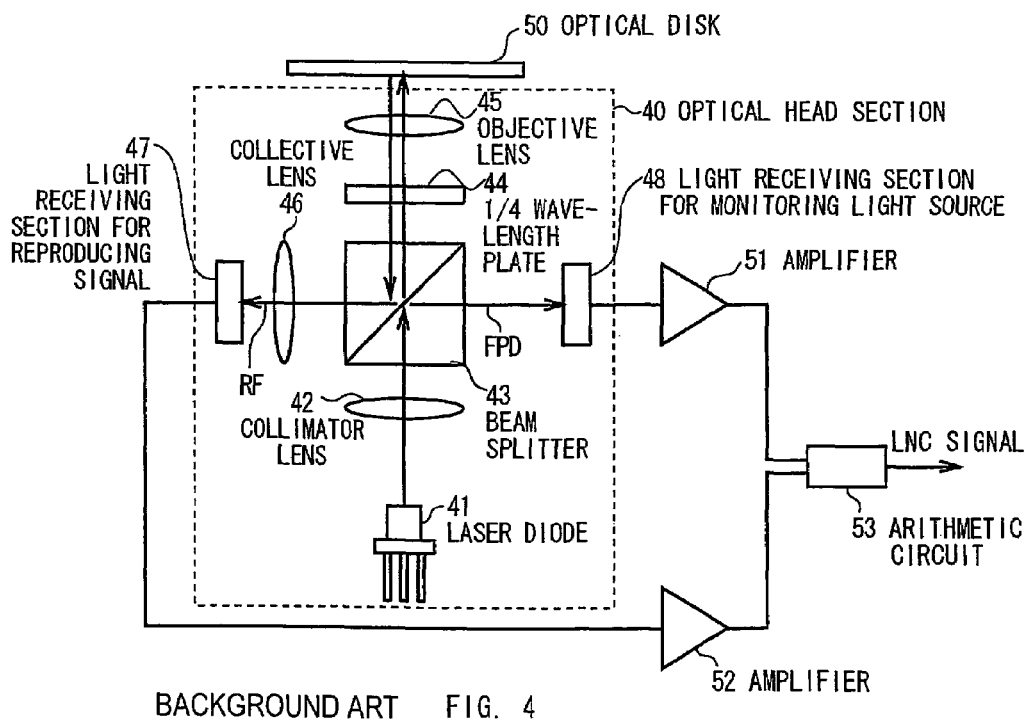
BACKGROUND ART   FIG. 4

OPTICAL DISK UNIT

TECHNICAL FIELD

The present invention relates to an optical disk apparatus that uses an optical disks such as a digital versatile disc (DVD) and a compact disc (CD) as recording mediums, for recording or reproducing data by irradiating this optical disk with a laser beam, and more particularly relates to an optical disk apparatus in that noise components by a laser light source are eliminated.

BACKGROUND ART

In optical disks such as DVDs and CDs, analog signals are treated. Thus, requirements for light source noise are extremely severe.

On the other hand, as noise generated by a semiconductor laser that is used to record/reproduce data on/from an optical disk, there are return light noise and mode hopping noise. Both of them give serious interference on a reproducing signal.

The return light noise is caused by that because a part of a beam reflected on the optical disk returns to the inside of the semiconductor laser, the optical disk operates as an external reflective mirror and mode competition occurs between the disk and an original internal resonator and oscillation occurs. The mode hopping noise is noise that is generated when an axial mode changed by that the length of the resonator of the semiconductor laser itself varied by a change in temperature.

In an optical disk recording/reproducing apparatus, there is a problem that laser noise increases by a return light from an optical disk and a change in temperature of a semiconductor laser and it has a bad influence on a reproducing signal. As a technique to reduce the laser noise, there is a laser noise cancel (LNC) system in that noise components in a laser beam directly monitored are cancelled out from an optical signal that was subjected to modulation by an optical disk (for example, Japanese Patent Laid-Open number 2002-352459).

Here, a conventional optical disk apparatus in the LNC system will be described by FIG. 4.

Referring to FIG. 4, an optical head section 40 is composed of a laser diode (LD) 41, a collimator lens (CL) 42, a polarization beam splitter (BS) 43, a ¼ wavelength plate (QWP) 44, an objective lens (OL) 45, a collective lens 46, a light receiver for reproducing signal (RFPD) 47 and a light receiver for monitoring light source (FPD) 48.

In such optical disk apparatus, a laser beam emitted from the laser diode 41 passes through the collimator lens 42, and enters into the polarization beam splitter 43. A part of the laser beam which passed through the polarization beam splitter 43 passes through the ¼ wavelength plate 44 and is converted into a circularly polarized light, and then it is collected on an optical disk 50 by the objective lens 45. This laser beam is modulated by recorded information in the optical disk 50, and then it passes through the objective lens 45 and the ¼ wavelength plate 44 again. The laser beam is returned to a linearly polarized light by the ¼ wavelength plate 44 and enters into the polarization beam splitter 43. After the laser beam is reflected on its plane of polarization separation, the reflective light enters into the light receiver for reproducing signal 47 through the collective lens 46. On the other hand, a part of the laser beam emitted from the laser diode 41 is reflected on the plane of polarization separation of the polarization beam splitter 43, and the reflective light enters into the light receiver for monitoring light source 48.

Further, the optical signals detected by the light receiver for reproducing signal 47 and the light receiver for monitoring light source 48 are converted into electric signals. They are amplified by amplifiers 51 and 52 respectively so as to be equal to each other in noise level, and then an LNC signal by that only laser noise components were canceled out from an RF signal in an arithmetic circuit 53 formed by a differential amplifier circuit or the like is outputted.

Here, the polarization beam splitter 43 has polarization properties, and the ¼ wavelength plate 44 that restrains the effect of a return light is inserted in an optical path on which the RF signal is extracted. Therefore, the ratios of the TE wave to the TM wave of the laser beams received by the light receiver for reproducing signal 47 and the light receiver for monitoring light source 48 are sometimes different. In this case, relativity of noise between the TE wave and the TM wave of the laser beam emitted from the laser diode 41 is low. Therefore, even if all of the noise can be canceled out in the arithmetic circuit 53 by equalizing the level of one of noise components (for example, a TE component) in the RF signal received by the light receiver for reproducing signal 47 to the level of a noise component in an FPD signal (the same TE component) received by the light receiver for monitoring light source 48 by the amplifiers 51 and 52, the noise of another noise component (a TM component) cannot be completely canceled out because their levels are different.

Specifically, in the laser diode 41, as modes showing a polarization direction of a laser beam emitted from the laser diode 41, as shown in FIG. 5, there are two modes of a TE mode in which the electric field is polarized to the direction parallel to an active region layer (the direction vertical to the thickness direction of the active region layer), and a TM mode in which the electric field is polarized to the direction vertical to the active region (the direction parallel to the thickness direction of the active region layer). In their modes, noise is generated mutually not correlatively. Thus, there is a problem that a canceled amount lowers in optical systems having polarization dependency.

DISCLOSURE OF INVENTION

Considering the above points, the present invention has been done and is proposing an optical disk apparatus in that laser noise components of two orthogonal polarization components in a laser beam emitted from a laser light source (a TE wave of which the polarization direction is in the TM mode, and a TM wave of which the polarization direction is in the TM mode) can be certainly eliminated.

To obviate the above problems, according to the present invention, in an optical disk apparatus having a light separator for distributing a laser beam from a laser light source toward an optical disk and a light receiver for monitoring light source and reflecting a reflective light from the optical disk toward a light receiver for reproducing signal, transmittance and reflectance to the S polarization and the P polarization of the light separator are adjusted so that a first polarization component level ratio being the ratio of the level of a component corresponding to the TE component to the level of a component corresponding to the TM component of the laser beam by that the reflective light from the optical disk was received by the light receiver for reproducing signal from the laser light source via the light separator, and a second polarization component level ratio being the ratio of the level of a component corresponding to the TE component to the level of a component corresponding to the TM component of the laser beam received by the light receiver for monitoring light source from the laser light source via the light separator become equal or the difference between the first and the second polarization component level ratios becomes within a predetermined permissible range, and the difference between a laser noise component received by the light receiver for reproducing signal and a laser noise component received by the light receiver for monitoring light source after the adjustment is obtained, so that a reproducing signal in that a desired amount of laser noise was canceled out is obtained.

As a result, in this optical disk apparatus, a reproducing signal in which laser noise components of the TE component and the TM component of a laser beam shot from the laser light source were surely eliminated or were restrained within a permissible range can be obtained.

Further, according to the present invention, in an optical disk apparatus having a light separator for distributing a laser beam from a laser light source toward an optical disk and a light receiver for monitoring light source and reflecting a reflective light from the optical disk toward a light receiver for reproducing signal, a polarizer for passing through either one of the TE component and the TM component of the laser beam emitted from the laser light source is provided between the laser light source and the light separator, by the polarizer, transmittance and reflectance to the S polarization and the P polarization of the light separator are adjusted so that a first polarization component level ratio being the ratio of the level of a component corresponding to the TE component to the level of a component corresponding to the TM component of the laser beam by that the reflective light from the optical disk was received by the light receiver for reproducing signal from the laser light source via the light separator, and a second polarization component level ratio being the ratio of the level of a component corresponding to the TE component to the level of a component corresponding to the TM component of the laser beam received by the light receiver for monitoring light source from the laser light source via the light separator become equal, and the difference between a laser noise component received by the light receiver for reproducing signal and a laser noise component received by the light receiver for monitoring light source after the adjustment is obtained, so that a reproducing signal in that laser noise was canceled out is obtained.

As a result, in this optical disk apparatus, a reproducing signal in which laser noise components of the TE component and the TM component of a laser beam shot from the laser light source were surely eliminated can be obtained.

BRIEF DESCRIPTION OF DRAWINGS

FIG. 3 is a block diagram showing another embodiment of an optical disk apparatus according to the present invention.

FIG. 4 is a block diagram showing a conventional optical disk apparatus in an LNC system.

BEST MODE FOR CARRYING OUT THE INVENTION

Figure 1:
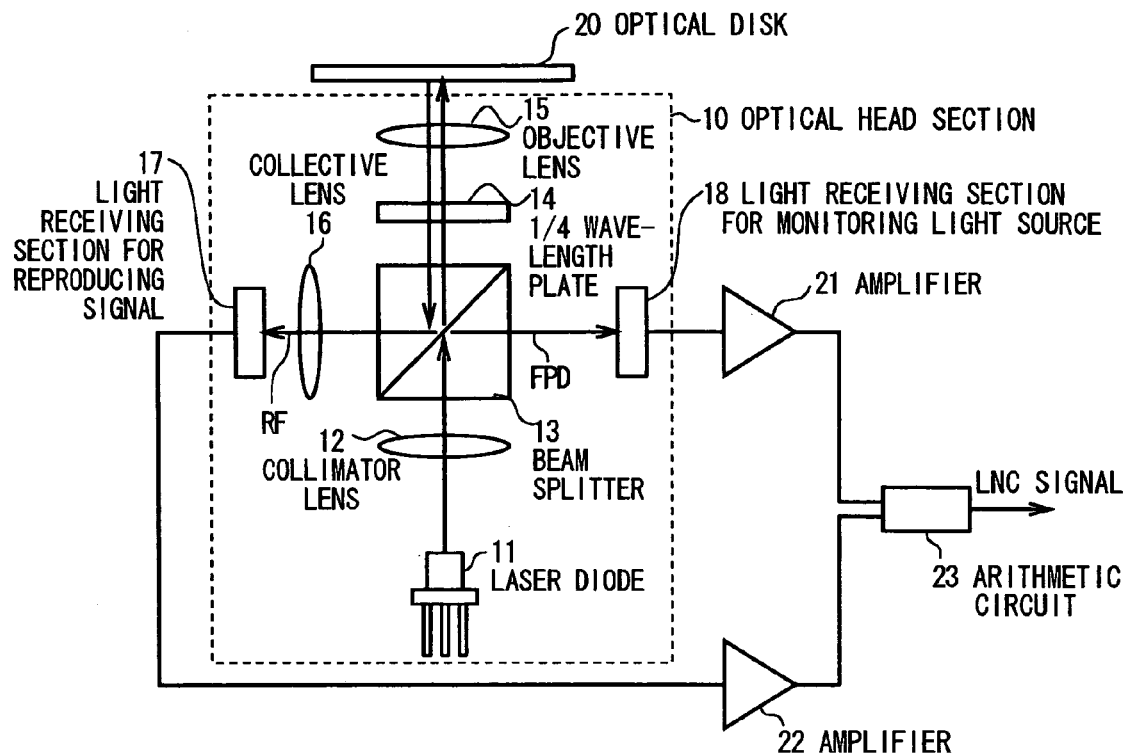
FIG. 1 is a block diagram showing an embodiment of an optical disk apparatus according to the present invention.

An optical disk apparatus in the best mode to carry out this invention is formed so that transmittance and reflectance to the S polarization and the P polarization of a light separator are adjusted so that the ratio of the level of a component corresponding to the TE component to the TM level of a component corresponding to the component of a laser beam received by a light receiver for reproducing signal from a laser light source via a light separator (hereinafter, this is referred to as a first polarization component level ratio), and the ratio of the level of a component corresponding to the TE component to the level of a component corresponding to the TM component of a laser beam received by a light receiver for monitoring light source from the laser light source via the light separator (hereinafter, this is referred to as a second polarization component level ratio) become equal, or the difference between the first and the second polarization component level ratios becomes within a predetermined permissible range, and the difference between a laser noise component received by the light receiver for reproducing signal and a laser noise component received by the light receiver for monitoring light source after this adjustment is obtained, so that a reproducing signal in that a desired amount of laser noise was canceled out is obtained.

Then, necessary values of a polarization ratio LDp being the ratio of the level of the TE component to the level of the TM component that are emitted from the laser light source, the ratio RFpo of the transmittance of a component corresponding to the TE component to the transmittance of a component corresponding to the TM component of the laser beam from the laser light source to the light receiver for reproducing signal, that is determined by an optical element existing on the optical path between the laser light source and the light receiver for reproducing signal (hereinafter, this is referred to as a first polarization component transmittance ratio), the ratio FPDpo of the transmittance of a component corresponding to the TE component to the transmittance of a component corresponding to the TM component of the laser beam from the laser light source to the light receiver for monitoring light source, that is determined by an optical element existing on the optical path between the laser light source and the above light receiver for monitoring light source (hereinafter, this is referred to as a second polarization component transmittance ratio), and a laser noise canceled amount Na are set to be represented by the following relational expression:

$$[\{2(1-\cos(\operatorname{Arctan}(1/(LDp \cdot RFpo))-\operatorname{Arctan}(1/(LDp \cdot FPDpo))))\}]^{1/2} \leq Na \quad (2)$$

Thereby, laser noise components included in the TE polarization component and the TM polarization component in the laser light source can be restrained within a desired permissible range.

(1) EMBODIMENT 1

An embodiment of an optical disk apparatus according to the present invention will be described.

Figure 2:
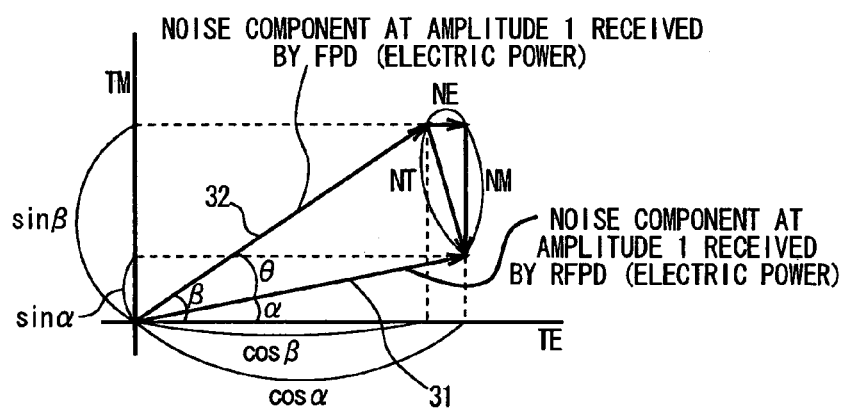
FIG. 2 is an explanatory diagram showing the relationship between a noise component received by a light receiver for reproducing signal and a noise component received by a light receiver for monitoring light source, to a TE wave and a TM wave in a laser diode (a laser light source) in this embodiment.
Figure 5:
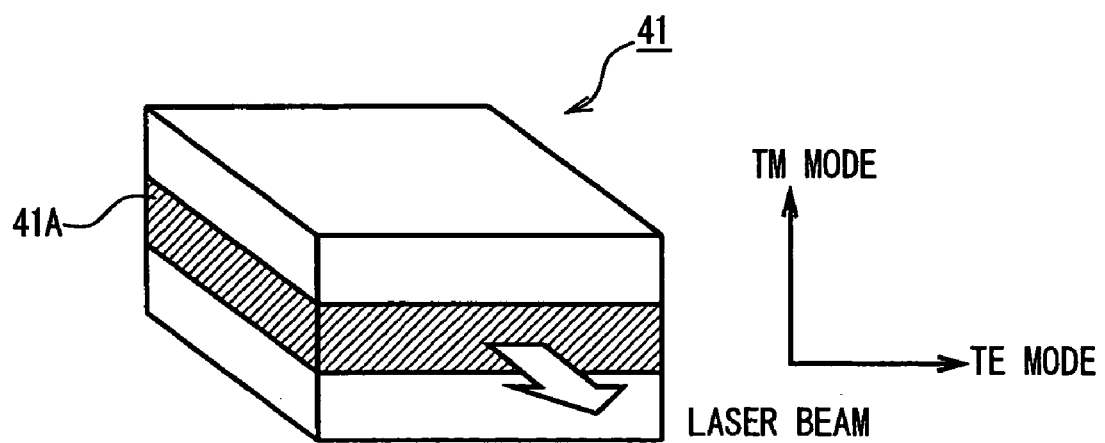
FIG. 5 is an explanatory diagram for explaining a TE mode and a TM mode in a laser beam emitted from a laser diode.

FIG. 1 is a block diagram showing an example of an optical disk apparatus according to the present invention. FIG. 2 is an explanatory diagram showing the relationship between a noise component received by a light receiver for reproducing signal and a noise component received by a light receiver for monitoring light source, to a TE wave and a TM wave in a laser diode (a laser light source) in this embodiment.

Referring to FIG. 1, an optical head section 10 has a laser diode (LD) 11, a collimator lens (CL) 12, a polarization beam splitter (BS) 13, a ¼ wavelength plate (QWP) 14, an objective lens (OL) 15, a collective lens 16, a light receiver for reproducing signal (RFPD) 17 and a light receiver for monitoring light source (FPD) 18.

Further, amplifiers 21 and 22 are connected to the output terminals of the light receiver for reproducing signal 17 and the light receiver for monitoring light source 18 respectively. The respective output signals of the amplifiers 21 and 22 are supplied to an arithmetic circuit 23 formed by a differential amplifier circuit or the like.

In this optical disk apparatus, a laser beam emitted from the laser diode 11 passes through the collimator lens 12, and enters into the polarization beam splitter 13. A part of the laser beam that passed through the polarization beam splitter 13 passes through the ¼ wavelength plate 14 and is converted into a circularly polarized light, and then it is collected on an optical disk 20 by the objective lens 15. Then, this laser beam is modulated by recorded information in the optical disk 20. The modulated laser beam passes through the objective lens 15 and the ¼ wavelength plate 14 again. The laser beam is returned to a linearly polarization by the ¼ wavelength plate 14 and enters into the polarization beam splitter 13, and is reflected on the plane of polarization separation of the polarization beam splitter 13. The laser beam reflected on the plane of polarization separation passes through the collective lens 16 and enters into the light receiver for reproducing signal 17, and is converted into an electric signal by the light receiver for reproducing signal 17.

On the other hand, a part of the laser beam emitted from the laser diode 11 is reflected on the plane of polarization separation of the polarization beam splitter 13, and enters into the light receiver for monitoring light source 18. This laser beam which entered into the light receiver for monitoring light source 18 is converted into an electric signal.

The optical signals detected by the light receiver for reproducing signal 17 and the light receiver for monitoring light source 18 are converted into electric signals. Each of the electric signals are amplified by the amplifiers 21 and 22 respectively so as to be equal in noise level, and then an LNC signal by that laser noise components were canceled out from an RF signal in the arithmetic circuit 23 is supplied.

As emitting modes of the above laser diode 11, there are two modes of the TE mode and the TM mode. In their modes, noise is generated mutually not correlatively. Therefore, in an optical head section on a non-polarization system, the aforementioned first polarization component level ratio being the ratio of the level of a component corresponding to the TE component to a component corresponding to the TM component of a laser beam received by the light receiver for reproducing signal 17, and the aforementioned second polarization component level ratio being the ratio of the level of a component corresponding to the TE component to the level of a component corresponding to the TM component of a laser beam received by the light receiver for monitoring light source 18 are different. Thus, there is a problem that a canceled amount of laser noise lowers.

To obviate this, in this embodiment, transmittance and reflectance to the S polarization and the P polarization in the polarization beam splitter 13 is adjusted so that the above first polarization component level ratio of the laser beam received by the light receiver for reproducing signal 17 from the laser diode 11 via the polarization beam splitter 13 being a light separator, and the above second polarization component level ratio of the laser beam received by the light receiver for monitoring light source 18 from the laser diode 11 via the polarization beam splitter 13 become equal or the difference between the first and the second polarization component level ratios becomes within a predetermined permissible range, and the difference between a laser noise component received by the light receiver for reproducing signal 17 and a laser noise component received by the light receiver for monitoring light source 18 after this adjustment is obtained, so that a reproducing signal in that a desired amount of laser noise was canceled out is obtained. Hereinafter, the detail will be described with reference to FIG. 2.

Referring to FIG. 2, a vector 31 represents a laser noise component at an amplitude 1 received by the light receiver for reproducing signal 17, and a vector 32 represents a laser noise component at an amplitude 1 received by the light receiver for monitoring light source 18.

Further, referring to FIG. 2, α and β representing the component ratio of TE to TM can be represented by the following equations.

$$\alpha = \text{Arctan}(1/RFp) \qquad (3)$$
$$= \text{Arctan}\{1/(LDp \cdot RFpo)\}$$

$$\beta = \text{Arctan}(1/FPDp) \qquad (4)$$
$$= \text{Arctan}\{1/(LDp \cdot FPDpo)\}$$

Here, "LDp" means the polarization ratio of the level of the TE component to the level of the TM component emitted from the laser diode 11 (TE/TM), "RFp" means the aforementioned first polarization component level ratio (TE/TM) being the ratio of the level of a component corresponding to the TE component to the level of a component corresponding to the TM component of the laser beam received by the light receiver for reproducing signal 17, "FPDp" means the aforementioned second polarization component level ratio (TE/TM) being the ratio of the level of a component corresponding to the TE component to the level of a component corresponding to the TM component of the laser beam received by the light receiver for monitoring light source 18, "RFpo" means the aforementioned first polarization component transmittance ratio (TE/TM) being the ratio of the transmittance of a component corresponding to the TE component to the transmittance of a component corresponding to the TM component of the laser beam from the laser diode 11 to the light receiver for reproducing signal 17, that is determined by optical elements including the polarization beam splitter 13 and the ¼ wavelength plate 14 existing on the optical path between the laser light 11 and the light receiver for reproducing signal 17, and "FPDpo" means the aforementioned second polarization component transmittance ratio (TE/TM) being the ratio of the transmittance of a component corresponding to the TE component to the transmittance of a component corresponding to the TM component of the laser beam from the laser diode 11 to the light receiver for monitoring light source 18, that is determined by optical elements including the polarization beam splitter 13 existing on the optical path between the laser diode 11 and the light receiver for monitoring light source 18.

If equalizing the size of the laser noise component received by the light receiver for reproducing signal 17 to the laser noise component received by the light receiver for monitoring light source 18 and obtaining the difference between them, as obvious from FIG. 2, TE residual laser noise NE, TM residual laser noise NM and total residual laser noise NT satisfy the following equations:

$$NE = \cos\alpha - \cos\beta \qquad (5)$$

$$NM = \sin\alpha - \sin\beta \qquad (6)$$

-continued $$NT = \{(\cos\alpha - \cos\beta)^2 + (\sin\alpha - \sin\beta)^2\}^{1/2} \quad (7)$$
$$= [2\{1 - \cos(\alpha - \beta)\}]^{1/2}$$
$$= \{2(1 - \cos\theta)\}^{1/2}$$

however, $\theta = \alpha - \beta$.

Here, when the laser noise canceled amount Na that will be required has been already known, it is necessary that the laser noise canceled amount Na satisfies the following expression:

$$[2\{1-\cos(\alpha-\beta)\}]^{1/2} = \{2(1-\cos\theta)\}^{1/2} \leq Na \quad (8)$$

However, the laser noise canceled amount Na is represented by the ratio of the laser noise level after laser noise cancel to the laser noise level before the laser noise cancel (the laser noise level-after the laser noise cancel/the laser noise level before the laser noise cancel).

Further, if transforming this expression (8) by the equations (3) and (4), it becomes as follows:

$$[\{2(1-\cos(\text{Arctan}(1/(LDp \cdot RFpo))-\text{Arctan}(1/(LDp \cdot FPDpo))))\}]^{1/2} \leq Na \quad (9)$$

That is, this expression (9) is achieved by adjusting the transmittance and the reflectance to the S polarization and the P polarization of the polarization beam splitter 13 so that the first polarization component level ratio RFp of the laser beam received by the light receiver for reproducing signal 17 from the laser diode 11 via the optical system including the polarization beam splitter 13 and the ¼ wavelength plate 14, and the second polarization component level ratio FPDp of the laser beam received by the light receiver for monitoring light source 18 from the laser diode 11 via the polarization beam splitter 13 become equal or the difference between the first and the second polarization component level ratios RFp and FPDp becomes within a predetermined permissible range. That is, being able to come this expression (9) means that a reproducing signal in which a desired amount of laser noise was canceled out can be obtained.

For example, referring to FIG. 1, if specially setting the transmittance of the P polarization Tp at Tp=90%, the reflectance of the P polarization Rp at Rp=10%, the transmittance of the S polarization Ts at Ts=0%, and the reflectance of the S polarization Rs at Rs=100% that are the polarization characteristics of the polarization beam splitter 13, although the ratios of quantity of receiving lights differ between the light receiver for reproducing signal 17 and the light receiver for monitoring light source 18, because both of the first and the second polarization component level ratios RFp and FPDp become TE:TM=10:0 (in the case where the TE is adjusted to the S direction), noise can be perfectly canceled out by adjusting the noise levels in the following stages of the amplifiers 21 and 22. Here, we considered that the polarization characteristics of the optical elements other than the polarization beam splitter 13 can be disregarded because they are generally small in comparison with the polarization beam splitter 13.

Next, the case where a laser noise canceled amount that will be required and α (a value that is obtained from the first polarization component transmittance ratio RFpo in the optical system from the laser diode 11 through the polarization beam splitter 13 to the light receiver for reproducing signal 17) have been known will be described. In this case, from the expression (8), it becomes as follows:

$$[2(1-\cos\theta)]^{1/2} \leq Na$$
$$2(1-\cos\theta) \leq Na^2$$
$$\text{Arccos}(1 - Na^2/2) \geq |\theta|$$
$$\geq |\alpha - \beta|$$

here, in the case of $\alpha - \beta \geq 0$, $$\text{Arccos}(1-Na^2/2) \geq \alpha-\beta$$

in the case of $\alpha - \beta < 0$, $$-\text{Arccos}(1-Na^2/2) < \alpha-\beta$$
$$-\text{Arccos}(1-Na^2/2) \leq \alpha-\beta \leq \text{Arccos}(1-Na^2/2)$$
$$\alpha-\text{Arccos}(1-Na^2/2) \leq \beta \leq \alpha+\text{Arccos}(1-Na^2/2) \quad (10)$$

Therefore, the second polarization component transmittance ratio FPDpo can be obtained from the expressions (4) and (10).

For instance, in the case of obtaining the second polarization component transmittance ratio FPDpo when it is set as LPD=100 (TE:TM=100:1), RFpo=1 (TE:TM=1:1), and a laser noise canceled amount Na that will be required is set as 20 dB (1/100), if applying the given conditions to the aforementioned equation (3), $$\alpha = \text{Arctan}\{(1/100 \cdot 1)\} = 0.010[\text{rad}] \quad (11)$$

If substituting the conditions of α and Na for this expression (10), $$0.01-\text{Arccos}(1-0.01^2/2 \leq \beta \leq 0.01+\text{Arccos}(1-0.01^2/2)-3.75\times10^{-7}[\text{rad}] \leq \beta \leq 0.020[\text{rad}] \quad (12)$$

Here, β can be represented by the expression (4). Thus, $$-3.75 \times 10^{-7} \leq \text{Arccos}\{1/(LDp \cdot FPDpo)\} \quad (13)$$
$$\leq 0.020$$
$$-3.75 \times 10^{-7} \leq \text{Arccos}(0.01/(FPDpo))$$
$$\leq 0.020$$

Both of the TE and the TM components are positive values. Thus, it is calculated as follows:

$$\text{Arccos}(0.01/FPDpo) \leq 0.020[\text{rad}]$$
$$FPDpo \geq 0.01/\tan(0.020) = 0.500 \quad (14)$$

By setting the second polarization component transmittance ratio FPDpo as a value above 0.5, laser noise cancel above 20 dB becomes possible.

Note that, most of these setting conditions in the optical system are determined by the polarization beam splitter 13.

(2) EMBODIMENT 2

Another embodiment of the present invention will be described by FIG. 3.

In FIG. 3, the same reference numerals are added to the same components as the components in FIG. 1 and the description of their configurations will be omitted. Description will be done by focusing the concentration on the section different from FIG. 1.

In this other embodiment, a respect different from FIG. 1 is that a polarization element 19 for transmitting either the TE component or the TM component in a laser beam emitted from a laser diode is provided between the laser diode 11 and the polarization beam splitter 13.

In this manner, by transmitting only one of the deflection components (for example, the TE wave component) emitted from the laser diode LD 11 by the polarization element 19, in the first and the second polarization component level ratios RFp and FPDp, it can be set as TE:TM=10:0 similarly to the case of the embodiment 1.

Further, in the case where a laser noise canceled amount that will be required has been previously known, it is unnecessary to perfectly equalize the first and the second polarization component level ratios RFp and FPDp in laser beams received by the light receiver for reproducing signal 17 and the light receiver for monitoring light source 18. It is good provided that the difference between the first and the second polarization component level ratios RFp and FPDp is limited within the range of error obtained from a required canceled amount based on the expressions (9) and (10).

Further, by adjusting the gains of the amplifiers 21 and 22, when the noise levels of an RF signal and an FPD signal are equalized by the amplifiers 21 and 22, the sizes of the noise levels (effective components in noise) are monitored and equalized. At this time, if the polarization ratio LDp being the ratio of the level of the TE component to the level of the TM component of the laser beam emitted from the laser diode 11, and the first polarization component transmittance ratio RFpo being the ratio of the transmittance of a component corresponding to the TE component to the transmittance of a component corresponding to the TM component of the laser beam from the laser diode 11 to the light receiver for reproducing signal 17, that is determined by the optical element existing on the optical path between the laser diode 11 and the light receiver for reproducing signal 17 have been known, the second polarization component transmittance ratio FPDpo being the ratio of the transmittance of a component corresponding to the TE component to the transmittance of a component corresponding to the TM component of the laser beam from the laser diode 11 to the light receiver for monitoring light source 18, that is determined by the optical element existing on the optical path between the laser diode 11 and the light receiver for monitoring light source 18 is obtained from the noise canceled amount Na that will be required.

Note that, in the above description as the examples, the polarization ratio is adjusted by the polarization characteristics of the polarization beam splitter. However, also in the case where the polarization ratio is adjusted by other optical component, it does not have any influence on the operation. Furthermore, the above description has been done based on the LNC being a subtraction system. However, similar effects can be expected in the application of this invention also to the multiplication system known by the Japanese Patent Laid-Open number 2002-183970.

INDUSTRIAL APPLICABILITY

The present invention is widely applicable to various optical disk apparatuses having a beam separator that distributes a laser beam from a laser light source toward an optical disk and a light receiver for monitoring light source and reflects a reflective light from the optical disk toward a light receiver for reproducing signal.

The invention claimed is:

1. An optical disk apparatus having a laser light source, a light receiver for reproducing signal for receiving a reflective light from an optical disk of a laser beam by that said laser light source irradiated the optical disk and converting it into an electric signal, a light receiver for monitoring light source for detecting said laser beam from said laser light source, and a light separator for distributing said laser beam from said laser light source toward said optical disk and said light receiver for monitoring light source and reflecting said reflective light from said optical disk toward said light receiver for reproducing signal, wherein:

transmittance and reflectance to an S polarization and a P polarization of said light separator are adjusted so that a first polarization component level ratio being a ratio of a level of a component corresponding to a TE component to a level of a component corresponding to a TM component of said laser beam by that said reflective light from said optical disk was received by said light receiver for reproducing signal from said laser light source via said light separator, and a second polarization component level ratio being a ratio of a level of a component corresponding to the TE component to the level of a component corresponding to the TM component of said laser beam by that said laser beam from said laser light source was received by said light receiver for monitoring light source via said light separator become equal or a difference between the first and the second polarization component level ratios becomes within a predetermined permissible range; and the difference between a laser noise component received by said light receiver for reproducing signal and a laser noise component received by said light receiver for monitoring light source after said adjustment is obtained, in order to obtain a reproducing signal in that a desired amount of laser noises were canceled out, wherein a necessary value of a laser noise canceled amount Na is represented so that said difference between the first and the second polarization component level ratios becomes within said permissible range, by the following expression of relation:

$$[\{2(1-\cos(\text{Arctan}(1/(LDp \cdot Rfpo))-\text{Arctan}(1/(LDp \cdot FPDpo))))\}]^{1/2} \leq Na \quad (1)$$

however,

Na: a noise level after laser noise cancel/a noise level before laser noise cancel, LDp: a ratio of a level of the TE component to a level of the TM component of the laser beam emitted from said laser light source, RFpo: a ratio of a transmittance of a component corresponding to said TE component to a transmittance of a component corresponding to said TM component of said laser beam from said laser light source to said light receiver for reproducing signal, that is determined by said light separator existing on an optical path between said laser light source and said light receiver for reproducing signal, FPDpo: a ratio of a transmittance of a component corresponding to said TE component to a transmittance of a component corresponding to said TM component of said laser beam from said laser light source to said light receiver for monitoring light source, that is determined by said light separator existing on and optical path between said laser light source and said light receiver for monitoring light source.

2. The optical disk apparatus according to claim 1, wherein;
said light separator is a polarization beam splitter.

3. The optical disk apparatus according to claim 1, wherein;
in said light separator, said transmittance to said S polarization is set at 0%, and said reflectance to the above S polarization is set at 100%, and also said transmittance to said P polarization is set at 90%, and said reflectance to the above P polarization is set at 10%.

4. An optical disk apparatus having a laser light source, a light receiver for reproducing signal for receiving a reflective light from an optical disk of a laser beam by that said laser light source irradiated the optical disk and converting the reflective light into an electric signal, a light receiver for monitoring light source for detecting said laser beam from said laser light source, and a light separator for distributing said laser beam from said laser light source toward said optical disk and said light receiver for monitoring light source and reflecting said reflective light from said optical disk toward said light receiver for reproducing signal, wherein:
a polarizer for passing through either one of the TE component and the TM component of said laser beam emitted from said laser light source is provided between said laser light source and said light separator;
by said polarizer, transmittance and reflectance to the S polarization and a P polarization of said light separator are adjusted so that a first polarization component level ratio being the ratio of the level of a component corresponding to the TE component to the a level of a component corresponding to the TM component of said laser beam by that said reflective light from said optical disk was received by said light receiver for reproducing signal from said laser light source via said light separator, and a second polarization component level ratio being the ratio of a level of a component corresponding to the TE component to the level of a component corresponding to the TM component of said laser beam by that said laser beam from said laser light source was received by said light receiver for monitoring light source via said light separator become equal or a difference between the first and the second polarization component level ratios becomes within a predetermined permissible range; and the difference between a laser noise component received by said light receiver for reproducing signal and a laser noise component received by said light receiver for monitoring light source after said adjustment is obtained, in order to obtain a reproducing signal in that laser noises were canceled out, wherein a necessary value of a laser noise canceled amount Na is represented so that said difference between the first and the second polarization component level ratios becomes within said permissible range, by the following expression of relation:

$$[\{2(1-\cos(\text{Arctan}(1/(LDp \cdot Rfpo))-\text{Arctan}(1/(LDp \cdot FPDpo))))\}]^{1/2} \leq Na \quad (1)$$

however,
Na: the noise level after laser noise cancel/a noise level before the laser noise cancel, LDp: a ratio of the level of TE component to the level of the TM component of the laser beam emitted from said laser light source, RFpo: a ratio of the transmittance of a component corresponding to said TE component to a transmittance of a component corresponding to said TM component of said laser beam from said laser light source to said light receiver for reproducing signal, that is determined by said light separator existing on the optical path between said laser light source and said light receiver for reproducing signal, FPDpo: a ratio of the transmittance of a component corresponding to said TE component to a transmittance of a component corresponding to said TM component of said laser beam from said laser light source to said light receiver for monitoring light source, that is determined by said light separator existing on the optical path between said laser light source and said light receiver for monitoring light source.

5. The optical disk apparatus according to 4, wherein;
said light separator is a polarization beam splitter.

* * * * *